(12) United States Patent
Shibata

(10) Patent No.: US 10,540,735 B2
(45) Date of Patent: Jan. 21, 2020

(54) INFORMATION PROCESSING DEVICE, INFORMATION PROCESSING METHOD, AND RECORDING MEDIUM

(71) Applicant: NEC Corporation, Minato-ku, Tokyo (JP)

(72) Inventor: Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 310 days.

(21) Appl. No.: 15/529,547

(22) PCT Filed: Dec. 10, 2015

(86) PCT No.: PCT/JP2015/006170
§ 371 (c)(1),
(2) Date: May 25, 2017

(87) PCT Pub. No.: WO2016/098323
PCT Pub. Date: Jun. 23, 2016

(65) Prior Publication Data
US 2017/0316542 A1    Nov. 2, 2017

(30) Foreign Application Priority Data
Dec. 17, 2014   (JP) .................. 2014-255158

(51) Int. Cl.
*G06T 1/20*  (2006.01)
*G06T 1/60*  (2006.01)
(52) U.S. Cl.
CPC .  *G06T 1/20* (2013.01); *G06T 1/60* (2013.01)
(58) Field of Classification Search
None
See application file for complete search history.

(56) References Cited

U.S. PATENT DOCUMENTS

2014/0355900 A1* 12/2014 Shibata .................. G06T 5/002
                                                                 382/255

FOREIGN PATENT DOCUMENTS

JP    2010-072901 A    4/2010
WO    2013/011797 A1   1/2013

OTHER PUBLICATIONS

International Search Report for PCT Application No. PCT/JP2015/006170, dated Feb. 9, 2016.
English translation of Written opinion for PCT Application No. PCT/JP2015/006170.

* cited by examiner

*Primary Examiner* — David Perlman

(57) ABSTRACT

An information processing device acquiring to the present invention includes: a CPU; and a memory storing a program, wherein the CPU, by the program, configures: a variation-amount calculating unit that, for an input image, calculates a variation amount between a value of a predetermined pixel of the input image and values of peripheral pixels of the predetermined pixel; an attribute reliability unit that, based on an attribute that is a property of pixels within a specified area in the input image and the variation amount, calculates attribute reliability of the pixel; a regularization strength estimating unit that, based on image quality information about image quality for the attribute and the attribute reliability, estimates a regularization strength of the pixel; and an image reconstructing unit generates a reconstructed image that is an image acquired by reconstructing the input image by using the regularization strength.

15 Claims, 9 Drawing Sheets

INFORMATION PROCESSING DEVICE, INFORMATION PROCESSING METHOD, AND RECORDING MEDIUM

This application is a National Stage Entry of PCT/JP2015/006170 filed on Dec. 10, 2015, which claims priority from Japanese Patent Application 2014-255158 filed on Dec. 17, 2014, the contents of all of which are incorporated herein by reference, in their entirety.

TECHNICAL FIELD

The present invention relates to image processing, in particular, relates to an information processing device, an information processing method, and a recording medium involving adjustment of parameters in image processing.

BACKGROUND ART

To restore degraded images that have been deteriorated due to blur, noises, decreased resolution, or the like, an information processing device that restores images performs, for example, operations such as the following. The information processing device, first, generates a provisional restoration image (a candidate restoration image) based on a target degraded image (hereinafter, also referred to as the input image) by using initial setting parameters. Then, the information processing device generates an image which is simulated (applied) a deterioration process, such as blurring (a blurring effect), on the restoration image. Then, the information processing device corrects the restoration image such that a difference between the image generated by using simulation and the target degraded image is minimized.

However, in general, a plurality of solutions (pixel values) can be assumed for candidate solutions of a restoration image (for example, pixel values of an image) in the above processing. That is, in general, the information processing device cannot uniquely determine a solution. Thus, for example, the information processing device uses a constraint for solutions (for example, regularization) to uniquely determine a solution. In other words, the information processing device constrains solutions by using regularization, and uniquely determines a solution. The regularization used as a constraint is, for example, a constraint that suppresses variations of pixel values among adjacent pixels in a restoration image. The information processing device uniquely determines a solution as a restoration image by using the above regularization (for example, refer to PTL 1).

The technique described in PTL 1 uses a regularization strength to achieve both sharpness of a texture area and suppressing noises of a smooth area. Specifically, the technique described in PTL 1 determines a regularization strength such that a difference amount of the pixel value among adjacent pixels in a restoration image becomes large, based on the direction of the variation and the magnitude of the variation of the pixel value among the adjacent pixels for each pixel constituting an input image.

It should be noted that, in the following description, restoration of an image is also referred to as reconstruction of an image. Thus, a restoration image may also be referred to as a reconstructed image.

CITATION LIST

Patent Literature

[PTL 1] International Publication No. WO2013/011797

SUMMARY OF INVENTION

Technical Problem

However, in order to determine regularization strengths, the technique described in PTL 1 requires parameters relating to variation amounts of pixel values and the regularization strengths. Therefore, the information processing device needs to receive these values from a user prior to image processing.

However, in general, an image quality desired for an image differs respectively for an object included in the image, the use purpose of the image, and the user of the image. For example, how far noises in a smooth portion of an image should be suppressed, differs respectively for the use purpose of the image and the user of the image. Therefore, a user of an information processing device that processes images is required to set appropriate parameter values or adjust the parameter values to appropriate values for the image processing device in accordance with the purpose of the image processing. However, it is difficult for a general user who is not a specialist of image processing to appropriately adjust (specify) the parameter values. Thus, a user who is using the technique as described in PTL 1 cannot necessarily set (adjust) parameters appropriately in image processing.

The technique described in PTL 1, therefore, has an issue that adjustment (setting) of parameters in image processing is difficult. Thus, the technique described in PTL 1 cannot provide appropriate restoration images.

The objective of the present invention is to solve the above issue and to provide an information processing device, an information processing method, and a recording medium, with which a user can more easily adjust (specify) appropriate parameters in image processing.

Solution to Problem

An information processing device according to one aspect of the present invention includes: a Central Processing unit (CPU); and a memory connected to the CPU and storing a program. The CPU reads the program from the memory and configures: a variation-amount calculating unit that, for an input image as a target to be processed, calculates a variation amount between a value of a predetermined pixel of the input image and values of peripheral pixels of the predetermined pixel; an attribute reliability calculating unit that, based on an attribute that is a property of pixels within a specified area in the input image and the variation amount, calculates attribute reliability that is reliability of the attribute of the pixel of the input image; a regularization strength estimating unit that, based on image quality information that is information about image quality for the attribute and the attribute reliability, estimates a regularization strength of the pixel in the input image; and an image reconstructing unit that generates a reconstructed image that is an image acquired by reconstructing the input image by using the regularization strength.

An information processing method according to one aspect of the present invention includes: for an input image as a target to be processed, calculating a variation amount between a value of a predetermined pixel of the input image and values of peripheral pixels of the predetermined pixel; based on an attribute that is a property of pixels within a specified area in the input image and the variation amount, calculating attribute reliability that is reliability of the attribute of the pixel of the input image; based on image quality information that is information about image quality for the attribute and the attribute reliability, estimating a regularization strength of the pixel in the input image; and generating a reconstructed image that is an image acquired by reconstructing the input image by using the regularization strength.

A non-transitory computer-readable recording medium one aspect of the present invention embodies a program. The program causes a computer to perform a method. The method includes: for an input image as a target to be processed, calculating a variation amount between a value of a predetermined pixel of the input image and values of peripheral pixels of the predetermined pixel; based on an attribute that is a property of pixels within a specified area in the input image and the variation amount, calculating attribute reliability that is reliability of the attribute of the pixel of the input image; based on image quality information that is information about image quality for the attribute and the attribute reliability, estimating a regularization strength of the pixel in the input image; and generating a reconstructed image that is an image acquired by reconstructing the input image by using the regularization strength.

Advantageous Effects of Invention

The present invention can provide an effect that a user of the present invention can more easily adjust (specify) appropriate parameters in image processing.

DESCRIPTION OF EMBODIMENTS

Figure 1:
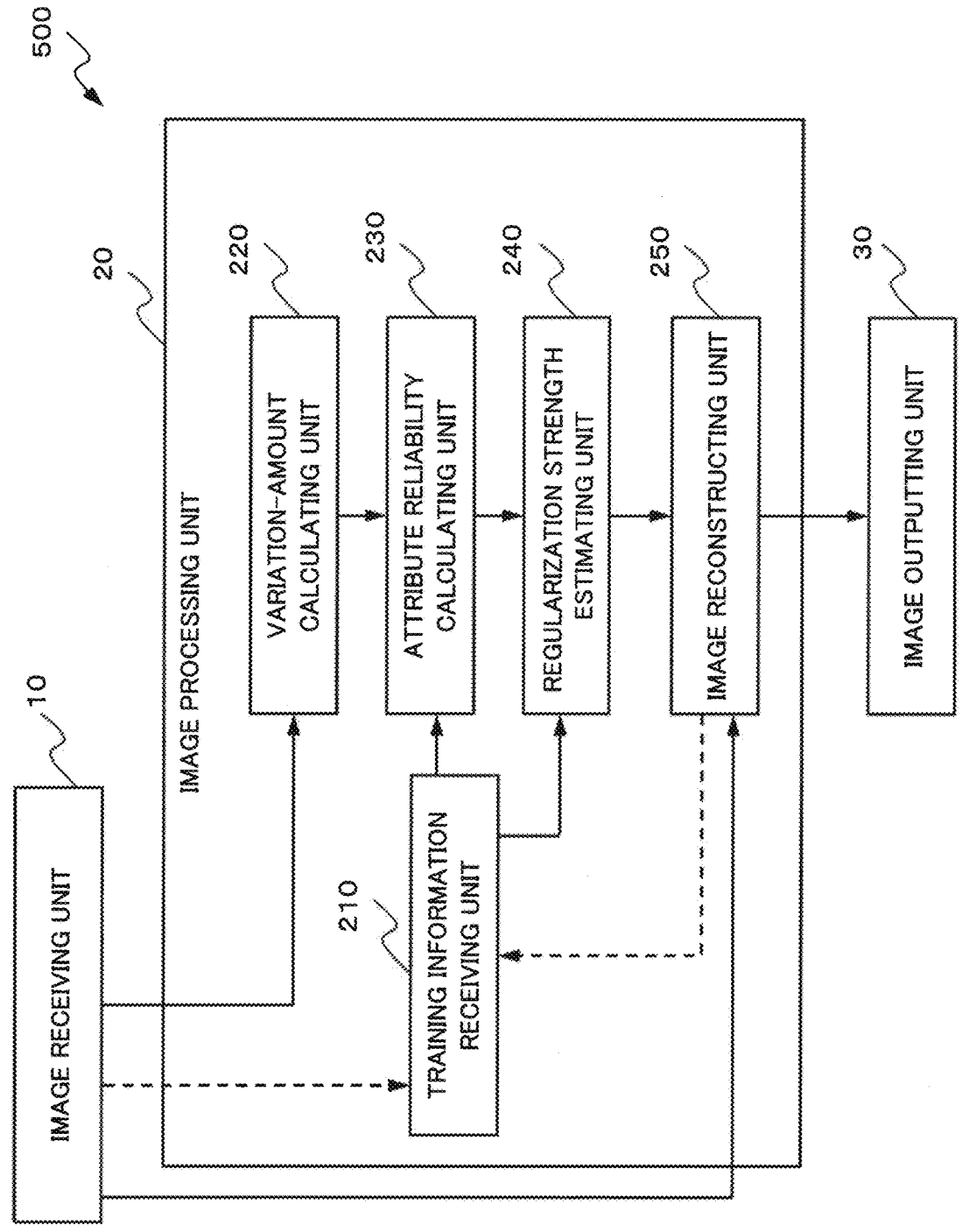
FIG. 1 is a block diagram illustrating an example of the configuration of an information processing device according to a first example embodiment of the present invention.

The following will describe example embodiments of the present invention with reference to the drawings.

It should be noted that the drawings are provided for illustration of the example embodiments of the present invention. However, the present invention is not restricted to the description of the drawings. Moreover, like numerals are assigned to like components throughout the drawings, thus, repetitions of the descriptions of such components may be omitted.

In the drawings used in the following description, components of parts that are irrelevant to the description of the example embodiments of the present invention may be omitted from the description and may not be illustrated.

Before the description, terms that are used in the description of the example embodiments of the present invention will be explained. It should be noted that the details of each operation used in the description of the terms will be described later.

An "input image" is an image that an information processing device according to the example embodiments of the present invention receives.

A "reconstructed image" is an image that is reconstructed (restored) based on an input image. It should be noted that a reconstructed image includes an image generated as a candidate partway through processing without limitation to an image as a final output from the information processing device according to the example embodiments. However, since there may be a case where an image generated as a candidate becomes a final image, a reconstructed image may sometimes be referred to as an output image in the following description.

A "degraded image" is an image generated by simulating (applying) a deterioration process to a reconstructed image. The deterioration process is not particularly limited. The deterioration process is, for example, blurring, adding (superposing) noises, or reducing resolution.

<First Example Embodiment>

The following will describe a first example embodiment of the present invention with reference to the drawings.

[Description of the Configuration]

FIG. 1 is a block diagram illustrating an example of the configuration of an information processing device 500 according to the first example embodiment of the present invention. The directions of arrows in FIG. 1 illustrate an example without limitation to directions of signals among blocks.

As illustrated in FIG. 1, the information processing device 500 according to the first example embodiment includes an image processing unit 20, an image receiving unit 10, and an image outputting unit 30.

The image receiving unit 10 receives an input image from other device, which is not illustrated, (for example, an imaging device, such as a camera or a scanner, or a device that processes an image, such as an editing device). For example, an editing device displays a plurality of images on a touch panel. A user operates the touch panel and selects an image. Then, the image receiving unit 10 may receive the image selected by the user from the editing device.

The image receiving unit 10 may record the received input image in a storage unit (for example, a memory), which is not illustrated.

It should be noted that the form of image data in the present example embodiment is not particularly restricted. However, in the following description, for convenience of explanation, an image is expressed using a column vector where the pixel values of pixels included in the image are arranged in raster scan order.

Further, a column vector [Y] of the input image that the image receiving unit 10 received is referred to as an input image vector [Y]. For example, when the number of pixels of the image that the image receiving unit 10 received is M, the input image vector [Y] is $[Y] (Y_1, \ldots, Y_i, \ldots, Y_M)^t$. Here, the superscript "t" added to the parentheses means a transposed matrix. Further, the column vector of which number of elements is M is equivalent to an M×1 matrix. Thus, the superscript "t" of the above vector means a column vector (a vector where vector elements are arranged in a column direction).

Likewise, the pixel values of pixels of a reconstructed image are represented using a column vector where the pixel values are arranged in raster scan order. Hereinafter, a column vector [X] of the reconstructed image is referred to as a reconstructed image vector [X]. For example, when the number of pixels in the reconstructed image is M', the reconstructed image vector [X] is $[X]=(X_1, \ldots, X_i, \ldots, X_{M'})^t$.

For convenience of explanation, the following will describe a case in which the number of pixels of an input image and the number of pixels of a reconstructed image are the same (that is, M=M'). However, this is for convenience of explanation, and the first example embodiment is not restricted to the case of M=M'. The number of pixels of an input image and the number of pixels of a reconstructed image may be different in the first example embodiment.

The image outputting unit 30 outputs the reconstructed image that is reconstructed by the image processing unit 20. The image outputting unit 30 may include, for example, a display device, not illustrated, to display (outputs) the reconstructed image. Alternatively, the image outputting unit 30 may transmit (output) the reconstructed image to the display device, not illustrated, (for example, the above editing device) via a network.

The image processing unit 20 generates (reconstructs) the reconstructed image based on the input image. Thus, the image processing unit 20 includes a training information receiving unit 210, a variation-amount calculating unit 220, an attribute reliability calculating unit 230, a regularization strength estimating unit 240, and an image reconstructing unit 220.

It should be noted that the image processing unit 20 may include a storage unit which is not illustrated. In such a case, each component may store each information, which will be described later, in the storage unit and retrieve the information from the storage unit. For convenience of explanation, in the following description, each component directly transmits information. However, this is not intended to eliminate cases of transmitting information by using the above-described storage unit. The image processing unit 20 may use the storage unit for transmitting a part or whole of information. The image outputting unit 30 may acquire the reconstructed image from this storage unit. Further, the same storage unit in the description of the above image receiving unit 10 may be used for this storage unit.

The training information receiving unit 210, when receiving the input image, also receives information that includes a specified area (area information), an attribute of the area (attribute information), and information of an image quality desired for the attribute (image quality information), along with the input image. Hereinafter, the information including the attribute information and the image quality information is referred to as "training information." However, the training information may include other information (for example, area information or preprocessing information). Preprocessing information is information relating to processing performed prior to image reconstruction (preprocessing) by the image reconstructing unit 250, as will be described later. The preprocessing is, for example, correction processing (brightness calibration, white balance processing, color tone calibration, or the like), filtering processing, or noise elimination processing.

"Area information" is information representing a range specified in the input image. The area information in the present example embodiment is not particularly restricted. The area information may be, for example, information representing a predetermined shape in the input image (for example, the position of the center and the radius when the shape is a circle). Alternatively, the area information may be a set of the coordinates of the contour line of an area.

"Attribute" is a property of an image within the specified area. The attribute in the present example embodiment is not particularly restricted. For example, the attribute may be a property of variations of the pixel values in an area, such as a texture area (an area where pixel values repeat varying in a certain regular manner) or a smooth area (an area where pixels vary little). Alternatively, the attribute may be a kind of object (a target object) included in an image, such as a car or a person. Alternatively, the attribute may be a kind of material of an object included in an image, such as iron or wood. Alternatively, the attribute may be a property relating to a physical quantity of an object included in an image, such as temperature or density. Alternatively, the attribute may be an optical property of an object included in an image, such as brightness or color. Alternatively, the attribute may be a property relating to the number of objects included in an image, such as the number of persons or items.

"Image quality information" is information for setting a strength of regularization (that is, the degree of constraint), as will be described later, in an attribute-specified area.

For example, it is assumed that a texture area and a smooth area are specified as attribute information given by a user. Then, it is assumed that, as image quality information, for example, the regularization strength of the texture area is specified as "0" and the regularization strength of the smooth area is specified as "1." The regularization strength in this case is a value indicating the degree of suppression (the value range is 0 to 1). Thus, the larger the regularization strength of an area is, the larger the suppression of the area is. That is, this image quality information is specification of regularization strengths that decreases suppression in a texture area and increases suppression in a smooth area.

As such, the image quality information may directly set regularization strengths for pixels. However, the image quality information is not restricted to this. The image quality information may be a parameter value in a predetermined calculation equation that is used for calculating the regularization strength.

Further, in the present example embodiment, the method of receiving the training information is not particularly limited.

For example, in the editing device used in the above description, after selecting an image, a user specifies an area (area information) in the selected image by operating a touch panel and, further, inputs the attribute information and the image quality information of the area. Then, the training information receiving unit 210, in accordance with receiving the input image, may also receive the above input training information (area information, attribute information, and image quality information) from the editing device. Thus, FIG. 1 indicates a connection from the image receiving unit 10 to the training information receiving unit 210 by using an arrow of a broken line. It should be noted that the training information receiving unit 210 may receive information included in the training information (area information, attribute information, and image quality information) at once or separately.

The operation of this training information receiving unit 210 will be described in more detail.

Figure 11:
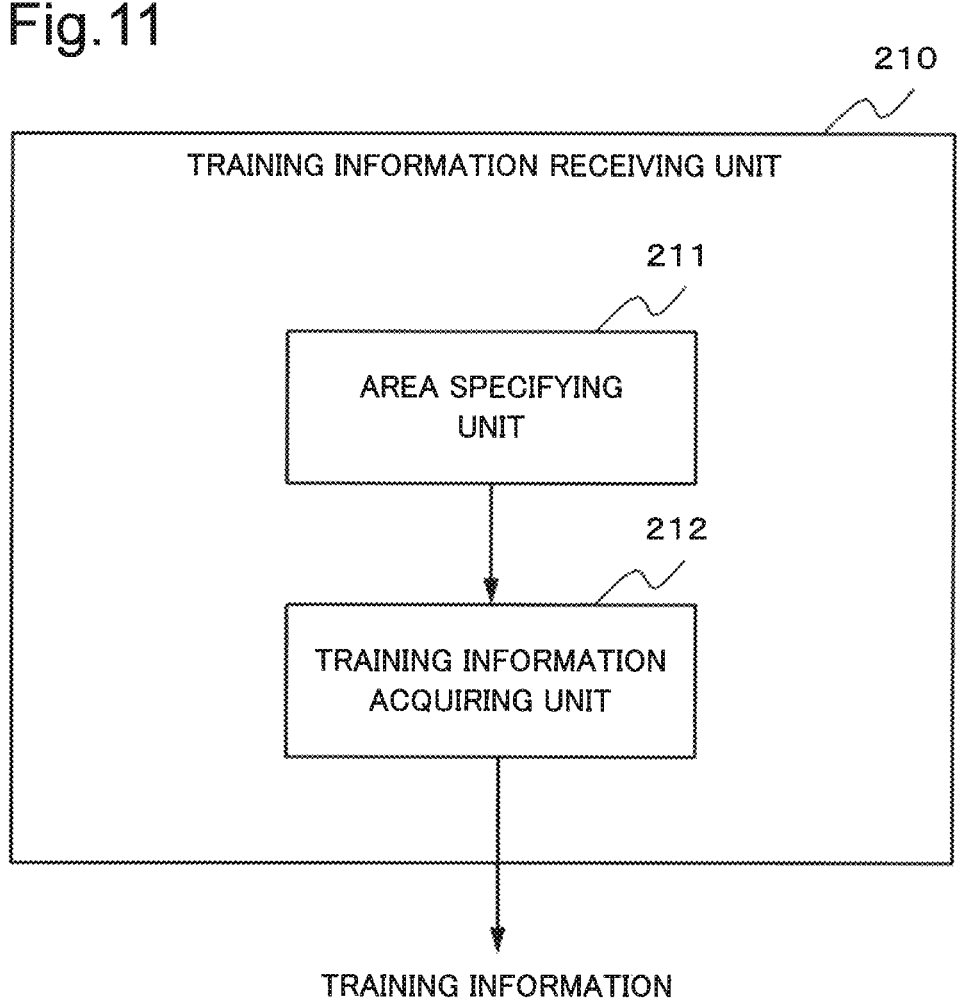
FIG. 11 is a block diagram illustrating an example of the configuration of a training information receiving unit according to the first example embodiment.

FIG. 11 is a block diagram illustrating an example of the configuration of the training information receiving unit 210. The directions of the arrows in FIG. 11 illustrate an example without limiting the directions of signals between the blocks.

As illustrated in FIG. 11, the training information receiving unit 210 includes an area specifying unit 211 and a training information acquiring unit 212.

The area specifying unit 211 receives specification of an area in the reconstructed image, from which training information is acquired. For example, the area specifying unit 211 includes a display device (for example, a liquid crystal display) and an input device (for example, a touch panel), which are not illustrated. Then, the area specifying unit 211 displays the reconstructed image on the display device (a liquid crystal display).

Figure 5:
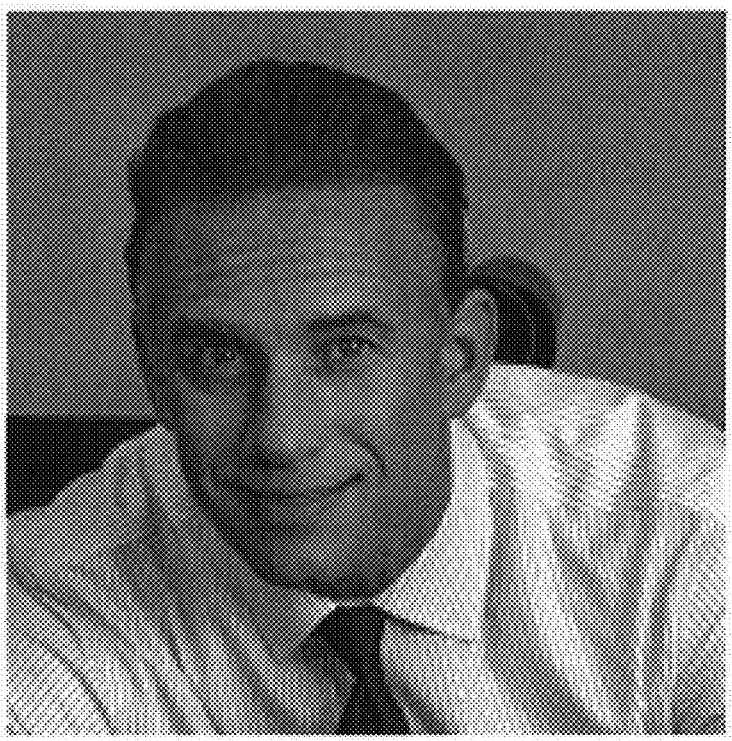
FIG. 5 is a diagram illustrating an example of an image that the information processing device according to the first example embodiment displays.

FIG. 5 is a diagram illustrating an example of an image displayed by the area specifying unit 211.

That is, it is assumed that the image illustrated in FIG. 5 is displayed on the display device included in the area specifying unit 211.

Then, a user of the information processing device 500 operates the input device (a touch panel) of the area specifying unit 211 that displays the image and specifies an area (area information) to be used as the training information on the reconstructed image.

Figure 6:
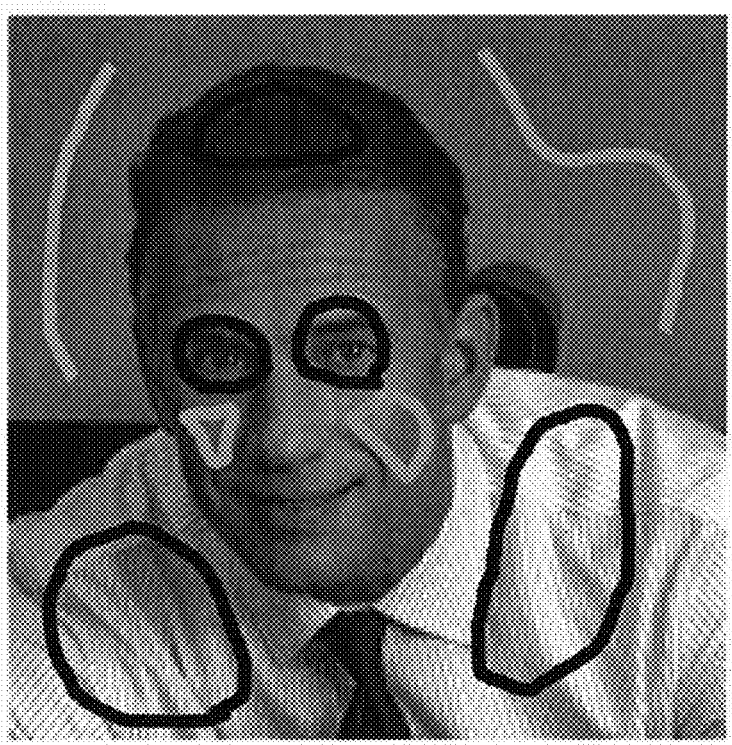
FIG. 6 is a diagram illustrating an example of specification of an area for training information in the information processing device according to the first example embodiment.

FIG. 6 is a diagram illustrating an example of specification of an area used as the training information. In FIG. 6, black lines indicated at portions of the eyes, cloths, and the like are specification of areas with a significant variation (for example, a texture area). Whereas, the gray lines indicated at the cheeks around the mouth and at the background wall are specification of areas with little variation (for example a smooth area).

It should be noted that, for the area specifying unit 211, other device, such as a mouse or a tablet, may instead be used without limitation to the touch panel, as an input device.

The area specifying unit 211 transmits the specified area (area information) to the training information acquiring unit 212.

Next, the training information acquiring unit 212 acquires an attribute (attribute information) of the specified area. For example, the training information acquiring unit 212 should receive attribute information for each of the specified area illustrated in FIG. 6. It should be noted that, when the area specifying unit 211 receives the area specification, the area specifying unit 211 may receive the attribute with the area specification. For example, the area specifying unit 211 is made to be able to select colors for specifying areas. For example, it is assumed that specification using black is specification for a texture area and specification using gray is specification for a smooth area. Then, the area specifying unit 211 may receive an input specifying color from the touch panel as specification of an area. In such a case, the area specifying unit 211 may transmit area information and attribute information relating to the specified area to the training information acquiring unit 212.

Next, the training information acquiring unit 212 acquires image quality information (for example, regularization strengths of the pixels of the reconstructed image) relating to the specified area. Then, the training information acquiring unit 212 may process the information received from the area specifying unit 211 and information acquired by itself, as the training information.

It should be noted that the above description describes a case where the training information receiving unit 210 uses regularization strengths of the input image as the image quality information. However, the present example embodiment is not restricted to this. For example, the training information receiving unit 210 may also acquire the image quality information as follows.

First, the image reconstructing unit 250, as will be described later, reconstructs (generates) the reconstructed images based on a plurality of the regularization strengths. Then, the training information receiving unit 210 transmits a plurality of the reconstructed images to a device that a user operates. The user device displays the plurality of received reconstructed images. It should be noted that this user device may be included in the information processing device 500.

Next, the device operated by the user prompts the user to select an image close to the image quality that is desired for a texture area and an image close to the image quality that is desired for a smooth area. Then, the device operated by the user notifies the information of the images respectively selected by the user (for example, the identifier or number of the image) to the training information receiving unit 210. The training information receiving unit 210 defines the regularization strength of the image selected for a texture area as the regularization strength when the attribute is a texture area. Likewise, the training information receiving unit 210 defines the regularization strength of the image selected for a smooth area as the regularization strength when the attribute is a smooth area. Then, the training information receiving unit 210 may use the above regularization strengths as image quality information.

The variation-amount calculating unit 220 calculates a variation amount of a pixel value, for each pixel, between the value of a pixel in the input image and the values of the peripheral pixels of the pixel. Here, the peripheral pixels are pixels adjacent to the target pixel (for example, four pixels on the top, bottom, left, and right sides, or eight pixels further including diagonally positioned pixels). The peripheral pixels may further include pixels in a predetermined range that are adjacent to the above-mentioned peripheral pixels. The variation-amount calculating unit 220 preferably calculates the variation amounts with respect to all the pixels of the input image. However, there is a case in which the input image includes an image that is not appropriate for processing. In such a case, the variation-amount calculating unit 220 may calculate the variation amounts with respect to pixels of a partial are of the input image. For example, the input image includes an object that is obviously not a target. In such a case, for example, the information processing device 500 receives designation of an area that is not a target from the device that the user operates. Accordingly, the variation-amount calculating unit 220 does not have to calculate the variation amounts of that area.

The variation amounts calculated by the variation-amount calculating unit 220 are not particularly restricted. The variation-amount calculating unit 220 may calculate a variation vector (magnitude of variation) and a directional unit vector (direction of variation), as a variation amount, for example, as follows.

The magnitude of the variation of the i-th pixel with reference to the peripheral pixels is $dY_i$. Then, a variation vector [dY] that is a column vector where the magnitudes of the variations ($dY_i$) are arranged in raster scan order is expressed as $[dY]=(dY_1, \ldots, dY_i, \ldots, dY_M)^t$. Further, at the i-th pixel (i=1, 2, . . . , M), a directional unit vector $[N]_i$ of variations including variations of two directions in x-direction and y-direction that are respective directions of two axes (an x axis and a y axis) that intersect in a right angle is expressed as $[N]_i=(N_{xi}, N_{yi})$. Hereinafter, an M×2 matrix where two directional unit vectors $[N]_i$ are arranged in a column direction in raster scan order is referred to as the directional unit vector [N].

An example of a method of calculating the variation vector [dY] and the directional unit vector [N] will be described in detail.

First, a method of calculating the variation vector [dY] will be described.

The variation vector [dY] may be defined in such a manner that, the larger the absolute value of the pixel value of an image that is acquired by multiply-adding a filter used for image processing to the input image is, the larger the value of the variation vector [dY] becomes.

The filter used for image processing is, for example, a Sobel filter, a Prewitt filter, a Laplacian filter, or a Gabor filter. The following will describe a case where a Sobel filter is used as an example.

Two vectors acquired by multiply-adding Sobel filters of x-direction and y-direction to the input image are respectively an x-direction variation vector $[Y_x]$ and a y-direction variation vector $[Y_y]$. For example, when the number of the pixels of the input image is M, the x-direction variation vector $[Y_x]$ is $[Y_x]=(Y_{x1}, \ldots, Y_{xi}, \ldots, Y_{xM})^t$. Further, the y-direction variation vector $[Y_y]$ is $[Y_y]=(Y_{y1}, \ldots, Y_{yi}, \ldots, Y_{yM})^t$. The variation-amount calculating unit 220 can calculates $dY_i$ that is the magnitude of a variation of a pixel value at pixel i (i-th element of a variation vector [dY]) by applying $Y_{xi}$ and $Y_{yi}$ to the following Equation 1.

[Equation 1]

$$dY_i=(Y_{xi}^2+Y_{yi}^2)^{1/2} \quad (1)$$

Next, a method of calculating the direction of the variation of a pixel value will be described.

The variation-amount calculating unit 220 calculates the directional unit vector [N] based on the magnitudes of the variation of a pixel value in x-direction and y-direction that have previously been calculated. For example, the variation-amount calculating unit 220 calculates the directional unit vector $[N]_i=(N_{xi}, N_{yi})$ of the variation of the pixel value at the i-th pixel by applying the values of the directional variation vector $(Y_{xi}, Y_{yi})$ and the magnitude of the variation of the pixel value (dYi) at i-th pixel to Equations 2 and 3.

[Equation 2]

$$N_{xi} = \frac{Y_{xi}}{dY_i} \quad (2)$$

[Equation 3]

$$N_{yi} = \frac{Y_{yi}}{dY_i} \quad (3)$$

So far, a case where the variation-amount calculating unit 220 calculates the magnitudes and directions of the variations of pixel values in edge segments and in larger scales than edge segments using a Sobel filter is described. However, the present example embodiment is not restricted to this. For example, the variation-amount calculating unit 220 may calculate magnitudes and directions of variations of pixel values in a plurality of different scales.

As a specific example, a case where the variation-amount calculating unit 220 calculates magnitudes and directions of variations of pixel values in L different scales will be described. In the following description, the scales are expressed using distances between pixels. However, in the present example embodiment, the scales are not restricted to distances between pixels.

The L different scales are expressed using a vector $[R]=(R_1, \ldots, R_I, \ldots, R_L)$ where scales of different distances are arranged in the order from the smallest scale. For example, among the L number of scales, the smallest scale is $R_1$, and the I-th scale from the smallest is $R_I$. The following will describe, as an example, a case of calculating the magnitudes and directions of the variations of the pixel values for the I-th smallest scale.

First, the variation-amount calculating unit 220 enlarges and interpolates a Sobel filter in x-direction and y-direction by $R_I$ times. Next, the variation-amount calculating unit 220 generates an image acquired by multiply-adding the enlarged and interpolated Sobel filter to the input image. At this time, the x-direction variation vector and the y-direction variation vector are respectively $[y_{xI}]$ and $[y_{yI}]$. For example, when the number of the pixels of the input image is M, the x-direction variation vector $[y_{xI}]$ is $[y_{xI}]=(y_{xI1}, \ldots, y_{xIi}, \ldots, y_{xIm})^t$. Further, the y-direction variation vector $[y_{yI}]$ is $[y_{yI}]=(y_{yI1}, \ldots, y_{yIi}, \ldots, y_{yIm})^t$. At this time, the variation-amount calculating unit 220 calculates the magnitude of the variation $dy_{Ii}$ of the pixel value at pixel i as expressed by the following Equation 4 using $y_{xIi}$ and $Y_{yIi}$.

[Equation 4]

$$dy_{Ii} = (y_{xIi}^2 + y_{yIi}^2)^{\frac{1}{2}} \quad (4)$$

Then, the variation-amount calculating unit 220 should generate the column vector $[dy_I]$ where the magnitude of the variations $dy_{Ii}$ at the respective pixels are arranged in raster scan order, as the magnitude of the variation for the scale.

Then, for calculation of the direction of the variation of a pixel value, the variation-amount calculating unit 220 determines (calculates) a direction which the pixel value varies based on the magnitudes of the variation of the pixel value in x-direction and y-direction that have previously been calculated. For example, the variation-amount calculating unit 220 may calculate a directional unit vector $[n]_{Ii}=(n_{xIi}, n_{yIi})$ which expresses the direction of the variation, as the direction of the variation of the pixel value at the i-th pixel, by using the magnitudes of the variation of the pixel value at i-th pixel, $y_{xIj}$, $y_{yIi}$, and $d_{yIi}$. The variation-amount calculating unit 220 should use similar equations to Equations 2 and 3 for this calculation.

It should be noted that, in the present example embodiment, the method of calculating the magnitudes and directions of the variations of pixel values for L different scales is not restricted to the above description. For example, the variation-amount calculating unit 220 may respectively define the magnitude and direction of the variation of the pixel value for the I-th smallest scale at the i-th pixel as average values of the magnitudes and directions of the variations of the pixel values of all the pixels, of which distance to the i-th pixel is less than $R_I$. It should be noted that, in addition to the magnitude of variation from peripheral pixels, the variation-amount calculating unit 220 may include the value of the pixel in the magnitude of the variation. This is because the same magnitudes of variations have different effects of influence between cases where the pixel value is small and where the pixel value is large.

The attribute reliability calculating unit 230 calculates reliability of each attribute for each pixel of the input image, by using the attribute included in the training information and the calculated variation amounts of the pixels of the input image. For example, when a texture area and a smooth area are specified as attributes, the attribute reliability calculating unit 230 calculates reliability as a texture area and reliability as a smooth area for the input image. The attribute reliability calculating unit 230 preferably calculates reliability for all the pixels of the input image. However, in the same way as the above variation-amount calculating unit 220, the attribute reliability calculating unit 230 may calculate reliability for pixels of a partial area of the input image.

It should be noted that the number of attributes, for which the attribute reliability calculating unit 230 calculates attribute reliability, is not particularly restricted. The attribute reliability calculating unit 230 calculates attribute reliability for one or a plurality of attributes.

In addition, the method of calculating reliability in the present example embodiment is not particularly restricted. For example, the method of calculating reliability should be selected according to an image that is actually desired.

For example, the attribute reliability calculating unit 230 constructs a classifier based on attribute information and the variation amounts of the pixel values relating to the attribute information. Then, the attribute reliability calculating unit 230 may calculate attribute reliability by applying the above classifier to the portion of the area of the image that is not included in the area of the attribute-specified pixels. It should be noted that the attribute reliability calculating unit 230 may determine the area of the attribute-specified pixels based on the area information.

However, the attribute reliability calculating unit 230 may also calculate reliability for the portion of the attribute-specified pixels. That is, the attribute reliability calculating unit 230 may calculate reliability for all the pixels of the input image as targets without distinguishing the areas. In such a case, the attribute reliability calculating unit 230 does not have to receive area information.

More specifically, the attribute reliability calculating unit 230 may operate as follows. In the following description, a Support Vector Machine (SVM) that is one of pattern recognition models is used as a classifier. Variables include $t_i$ representing attribute information (for example, 0 for a texture area, 1 for a smooth area) that is input as a seed, $\xi_i$ representing a variation amount of the related pixel, and $a_i$ and $h_i$ representing coefficients calculated based on prior learning. Kernel is expressed as $K(\cdot,\cdot)$. It should be noted that the kernel is a kernel function in a pattern recognition technique (an inner product in a feature space). In this time, the attribute reliability calculating unit 230 can calculate attribute reliability $\eta_j$ at pixel j by substituting the variation amount $\xi_j$ at pixel j into Equation 5 as indicated below.

[Equation 5]

$$\eta(\xi_j) = \sum_{i \in S}(a_i t_i K(\xi_i, \xi_j) - h_i) \quad (5)$$

In Equation 5, variable i is a subscript for distinguishing the elements of a support vector set (S). That is, $\Sigma$ of Equation 5 indicates the sum of all the elements of the support vector set (S).

Figure 7:
FIG. 7 is a diagram illustrating an example of attribute reliability calculated by the information processing device according to the first example embodiment.

FIG. 7 is a diagram illustrating an example of attribute reliability calculated based on the training information illustrated in FIG. 6. FIG. 7 illustrates reliability of the pixels using lightness. In FIG. 7, a white portion is a portion with the highest reliability as a smooth area. On the contrary, a black portion is a portion with the lowest reliability as a smooth area. Alternatively, from the perspective of the attribute of a texture area, the black portion is a portion with the highest reliability as a texture area.

The regularization strength estimating unit 240 estimates (calculates) the regularization strengths ($\lambda$) of the pixels of the input image based on the attribute reliability calculated by the attribute reliability calculating unit 230 and the image quality information. The regularization strength estimating unit 240 preferably estimates the regularization strengths $\lambda$ for all the pixels of the input image. However, in the same way as the above variation-amount calculating unit 220, the attribute reliability calculating unit 230 may estimate the regularization strengths $\lambda$ for pixels of a partial area of the input image.

In the present example embodiment, the method of estimating the regularization strength $\lambda$ is not particularly restricted.

Here, the following will describe, as an example of the method of estimating a regularization strength $\lambda$, a case where attribute information includes a smooth area and a texture area and image quality information is the regularization strengths of a smooth area and a texture area. However, the present example embodiment is not restricted to this example.

Here, the attribute reliability relating to a predetermined attribute of a pixel j is the regularization strength for the attribute is $\lambda_1$, and the regularization strength for the other attribute is $\lambda_0$. In such a case, the regularization strength estimating unit 240 may calculate the regularization strength $\lambda_j$ at pixel j by using the following Equation 6.

[Equation 6]

$$\lambda_j = \frac{\lambda_i \exp(\eta_j) + \lambda_0}{1 + \exp(\eta_j)} \quad (6)$$

Using Equation 6, the regularization strength estimating unit 240 calculates, as a regularization strength $\lambda_j$ at pixel j, a value close to regularization strength $\lambda_1$ when attribute reliability for the predetermined attribute is high, and a value close to $\lambda_0$ when attribute reliability for the predetermined attribute is low. It should be noted that hereinafter a vector where regularization strengths $\lambda_j$ for all the pixels are arranged in raster scan order is defined as $[\lambda]$.

For example, it is assumed that, as in the example that has previously been described, the image quality information is information where the regularization strength $\lambda_1$ of a texture area is "0" and the regularization strength $\lambda_0$ of a smooth area is "1". Thus, the training information receiving unit 210 receives image quality information so as to not suppress in a texture area, and to suppress in a smooth area from a user of the information processing device 500. Then, it is assumed that the attribute reliability calculating unit 230 calculates the attribute reliability $\eta_j$ of a texture area as reliability $\eta_j$ of the attribute. In such a case, the regularization strength estimating unit 240 calculates a value close to $\lambda_1$ (=0) as the regularization strength $\lambda$ for the texture area since the attribute reliability $\eta_j$ is high in the texture area. On the other hand, the regularization strength estimating unit 240 calculates a value close to $\lambda_0$ (=1) as the regularization strength $\lambda$ for the smooth area since the attribute reliability $\eta_j$ is low in the smooth area. In this way, the regularization strength estimating unit 240 can estimate (calculate) the regularization strengths $\lambda$ that conforms to the image quality information desired by a user (not suppressing a texture area, while suppressing a smooth area).

It should be noted that the information processing device 500 does not need to receive image quality information for all the attributes as the training information. For example, it is assumed that attributes are two kinds of areas (a texture area and a smooth area). Then, it is assumed that the image quality information for one attribute is opposite of the image quality information for the other attribute (for example, if a regularization strength for one attribute is 0, a regularization strength of the other attribute is 1). In such a case, for example, the training information receiving unit 210 may receive, as the training information, "attribute=texture area" and, as attribute information, "regularization strength=0" as image quality information. That is, the training information may be information relating to one of the attributes. It should be noted that this training information relates to the image quality of the attribute desired by a user.

In such a case, the attribute reliability calculating unit 230 should calculate reliability for a texture area as the attribute reliability $\eta$.

Then, the regularization strength estimating unit 240 uses training information "0" as the regularization strength $\lambda_1$ of Equation 6. Then, the regularization strength estimating unit 240 sets "1" that is the opposite value of the regularization strength $\lambda_1$ (=0) as the regularization strength $\lambda_0$ against regularization strength $\lambda_1$. Then, the regularization strength estimating unit 240 may execute the above-described processing.

As the result, the regularization strength estimating unit 240 estimates (calculates) the regularization strength (a value close to $\lambda_1$=0) that conforms to the image quality information that specifies pixels with high attribute reliability as the one attribute desired by a user (for example, a texture area). On the other hand, the regularization strength estimating unit 240 estimates (calculates) the regularization strength (a value close to $\lambda_0$=1) that is opposite to the specified image quality information as the regularization strength for pixels that have an attribute with low attribute reliability, that is, not desired by a user (for example, a smooth area).

In this way, the regularization strength estimating unit 240 of the information processing device 500 can estimate (calculate) a regularization strength that makes a pixel become the image quality desired by a user for the pixel of the attribute desired by the user based on the training information. Further, the regularization strength estimating unit 240 further can estimate (calculate) the regularization strength that makes a pixel apart from the image quality desired by a user for the pixel of the attribute not desired by the user.

The image reconstructing unit 250 generates a reconstructed image that is an image acquired by reconstructing the input image based on the regularization strength estimated by the regularization strength estimating unit 240. The method of reconstructing an image in the present example embodiment is not particularly restricted. For example, the image reconstructing unit 250 may reconstruct an image by using a method described in PTL 1. Alternatively, for reconstruction processing of an image, the image reconstructing unit 250 may generate the reconstructed image by using image enhancement that enhances a specific frequency component in an area where the above-described regularization strength is strong. Alternatively, for reconstruction processing of an image, the image reconstructing unit 250 may reconstruct (generate) an image by using image enhancement processing (for example, high dynamic range imaging) where the contrast of the image is enhanced in an area where the regularization strength is strong.

As a more specific example of reconstruction, the following will describe a case of using super resolution for reconstruction.

The image reconstructing unit 250 determines a regularization term "$E_{reg}([X])$" in accordance with the regularization strength applied to each pixel based on the regularization strength for each pixel of the input image. The determined regularization term $E_{reg}([X])$ may include an element of the direction of the variation of the pixel value. Then, the image reconstructing unit 250 determines an optimization function ($E(X)$), for the input image, that is the sum of the determined regularization term $E_{reg}$ ([X]) and an error term $E_{data}([X])$, as illustrated in Equation 7. It should be noted that "[ ]" indicating a vector is omitted in Equation 7.

[Equation 7]

$$E(X) = E_{data}(X) + \tau \cdot E_{reg}(X) \quad (7)$$

In Equation 7, the error term $E_{data}$ ([X]) is a function that takes a smaller value as a difference between an image acquired by simulating a deterioration process (such as blurring) (hereinafter, referred to as the degraded image) and the input image is smaller, with regard to the reconstructed image [X] that is acquired by reconstructing the input image [Y]. Here, $\tau$ in Equation 7 is a parameter defined in advance by a user of the information processing device 500.

The error term $E_{data}([X])$ expresses a relationship between the input image [Y] and the reconstructed image [X] by using the input image [Y] and a blur matrix [B]. In general, images are blurred images, that is, obscure images due to a variety of factors upon capturing the images (out of focus of an optical lens, camera shake, or the like).

A blurring function is a function representing such an effect of making an image obscure. The blurring function includes, for example, a point spread function (PSF). However, the blurring function is not restricted to the point spread function. The blurring function may be other functions that can express the degree of blur of blurred images. The blurring function is set in advance in the information processing device 500 as a function determined by a user of the information processing device 500. Hereinafter, the blurring function (or blur expressed using the blurring function) is represented using an N×N blur matrix [B]. Here, N is the number of pixels. Thus, the blur matrix [B] is a square matrix including rows and columns of the number of the pixels.

Here, the column vector of an image, of which number of pixels is M, is represented by [Z] and the column vector of an image which is blurred using a given blurring function is represented by $[Z]_b$. At this time, a relationship between the column vector [Z] and the column vector $[Z]_b$ is expressed as the following Equation 8 using the blur matrix [B]:

[Equation 8]

$$Z_b = B \cdot Z \quad (8)$$

It should be noted that the column vector [Z] represents an unblurred image and the column vector $[Z]_b$ represents a blurred image. Here, the input image [Y] is, in general, a blurred image. Thus, the input image [Y] corresponds to the column vector $[Z]_b$. Whereas, the reconstructed image [X] corresponds to the column vector [Z].

Then, the error term $E_{data}([X])$ is a function including the input image [Y], the reconstructed image [X], and, the blur matrix [B]. The error term $E_{data}([X])$ is a function that takes a smaller value as a difference between a blurred image (a degraded image) acquired by applying the blurring function [B] to the reconstructed image [X] and the input image is smaller. The error function $E_{data}([X])$ can be defined, for example, as a relation equation such as the following Equation 9.

[Equation 9]

$$E_{data}(X) = \|B \cdot X - Y\|_p^p \quad (9)$$

In Equation 9, p is a parameter that is set in advance by a user of the information processing device 500. The vertical double bar ($\|\cdot\|$) on the right side of Equation 9 represents a vector norm. Here, a norm is a generalized length in analysis. The subscript value (p) of the norm (double bar) represents a dimension. That is, "$\|\cdot\|_p$" represents a p-dimensional norm. It should be noted that the superscript value (p) represents the power.

On the other hand, the regularization term $E_{reg}([X])$ is, for example, expressed as the following Equation 10.

[Equation 10]

$$E_{reg}(X) = (D \cdot X)^t \cdot \text{diag}(\lambda) \cdot (D \cdot X) \quad (10)$$

In Equation 10, the matrix [D] is a matrix representing a differential filter for an image. Matrix diag[λ] is a diagonal matrix where the regularization strengths of pixels calculated by the regularization strength estimating unit 240 are diagonally arranged.

The image reconstructing unit 250 generates (searches) a reconstructed image [X] where the value of the optimization function E([X]) represented by Equation 7 becomes the minimum. The searching method used by the image reconstructing unit 250 is not particularly restricted. The searching method includes, for example, a gradient method or a conjugate gradient method. The image reconstructing unit 250 can search for each pixel value of the reconstructed image by using such methods. It should be noted that when the training information always includes the preprocessing information that has previously been described, the image reconstructing unit 250 may perform the preprocessing of the image based on the preprocessing information before image reconstruction that uses Equation 7.

Figure 8:
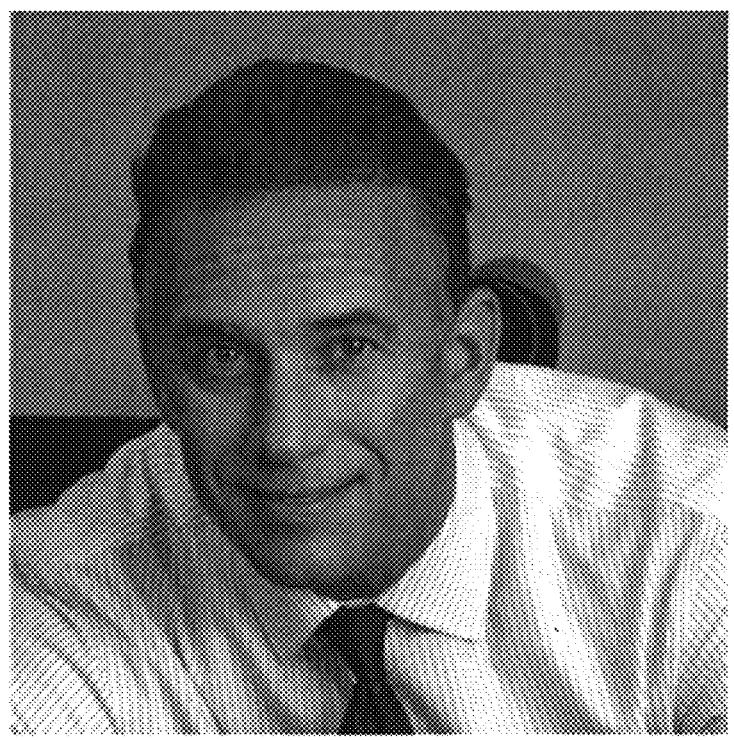
FIG. 8 is a diagram illustrating an example of an image reconstructed by the information processing device according to the first example embodiment.

FIG. 8 is a diagram illustrating an example of an image reconstructed based on the image illustrated in FIG. 5. The image illustrated in FIG. 8 has improved resolution in texture areas around the eyes, the patterned portion of the cloths, and the like, while maintaining the smoothness of smooth areas around the cheek, wall, and the like, when compared with the image illustrated in FIG. 5.

[Description of Operation]

The following will describe the operation of the information processing device 500 according to the present example embodiment with reference to the drawings.

Figure 2:
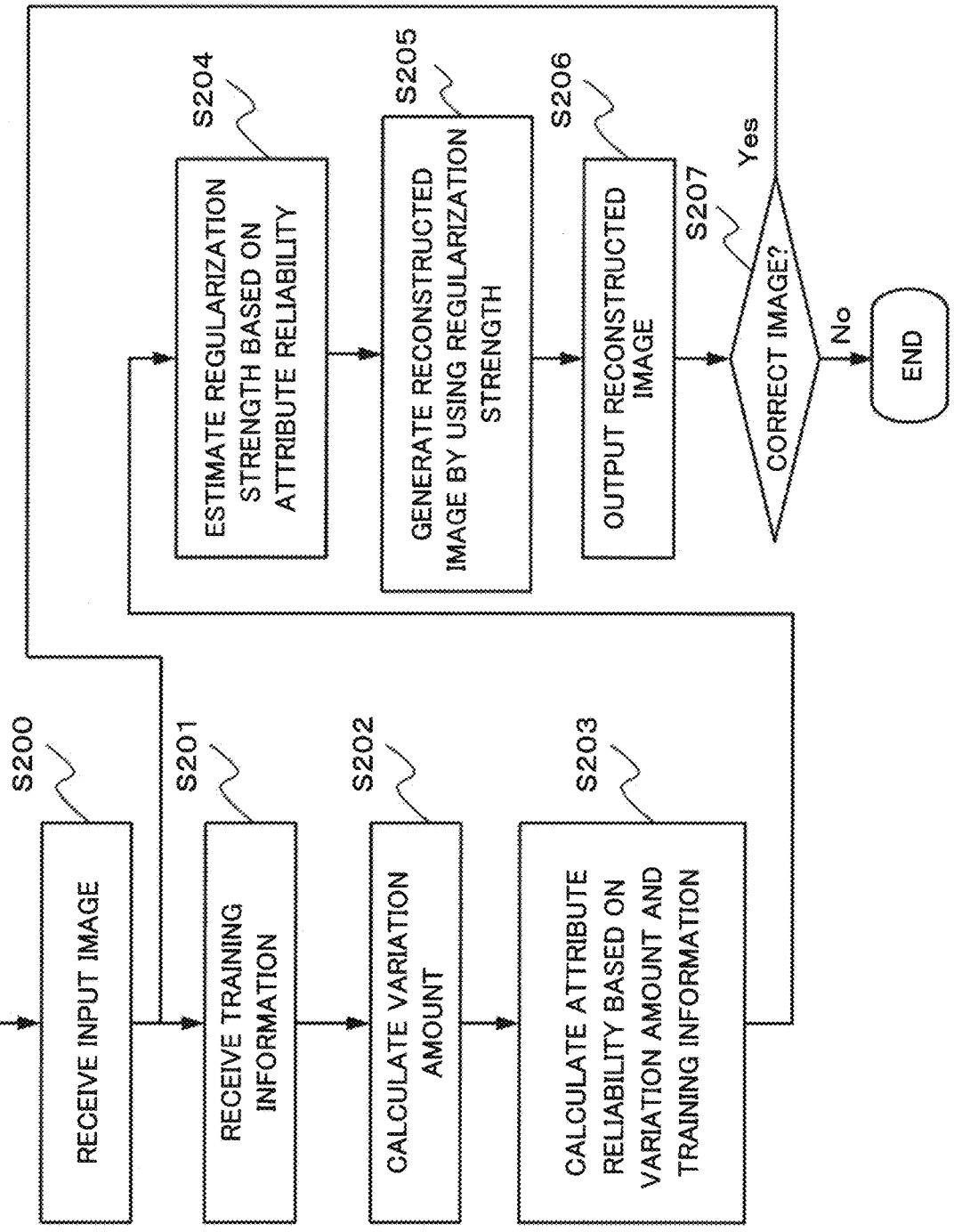
FIG. 2 is a flowchart illustrating an example of the operation of the information processing device according to the first example embodiment.

FIG. 2 is a flowchart illustrating an example of the operation of the information processing device 500 according to the present example embodiment.

First, the image receiving unit 10 receives an input image that is an image desired to be reconstructed (a target image) (step S200).

Next, the training information receiving unit 210 receives training information for the input image (step S201).

Further, the variation-amount calculating unit 220 calculates the variation amounts of the input image (step S202).

Next, the attribute reliability calculating unit 230 calculates attribute reliability based on the variation amount and the training information (step S203).

Next, the regularization strength estimating unit 240 estimates regularization strengths based on the attribute reliability (step S204).

Next, the image reconstructing unit 250 generates (reconstructs) a reconstructed image from the input image by using the regularization strengths (step S205).

The image outputting unit 30 outputs the reconstructed image (step S206).

The output reconstructed image is, for example, displayed on a device of a user, which is not illustrated. Then, when the user device receives a correction request from the user, the user device transmits the correction request to the information processing device 500.

When the information processing device 500 receives the correction request for the image from the user (Yes at step S207), the information processing device 500 returns to step S201 and repeats the above-described processing. It should be noted that the information processing device 500 receives at least training information as the correction request. However, the received training information may be a portion of training information (for example, a portion of attribute information and image quality information).

When not receiving the correction request for the image from the user (No at step S207), the information processing device 500 ends the processing.

[Description of Effect]

The following will describe the effect of the first example embodiment.

The information processing device 500 according to the first example embodiment provides an effect of enabling easier adjustment (specification) of appropriate parameters in image processing.

This is because of the following reason:

The variation-amount calculating unit 220 calculates the variation amounts of an input image. Then, the attribute reliability calculating unit 230 calculates attribute reliability based on the training information and the variation amounts. Then, the regularization strength estimating unit 240 estimates the regularization strengths based on the training information and the attribute reliability. The image reconstructing unit 250 generates a reconstructed image by reconstructing the input image using the regularization strengths. Thus, information that the information processing device 500 requires as an input is the training information.

Then, in the present example embodiment, the training information may include information of an attribute (attribute information) of a partial area of an input image and information of image quality for the attribute (image quality information). Thus, the attribute information and the image quality information is not specification of fine parameter values but selection of a classification of the image property to some extent and specification of selection of a desired image quality. Therefore, specification of training information is much simpler specification than typical specification of parameters of images. In this way, the information processing device 500 estimates an appropriate parameter (for example, regularization strength) based on simple specification by a user and reconstructs an image.

Further, a user of the information processing device 500 can specify correction of re-editing processing based on the reconstructed image generated by the information processing device 500. That is, the information processing device 500 can provide an easier method, which is image discrimination, compared with setting of parameter in an instruction of setting (designation) of image processing by a user.

In this way, the information processing device 500 enables users to perform easier specification.

[Variant 1]

The above-described information processing system 500 is configured as follows.

For example, each component of the information processing system 500 may be configured as a hardware circuit.

Alternatively, each component of the information processing system 500 may be configured using a plurality of devices that are connected via a network.

Figure 3:
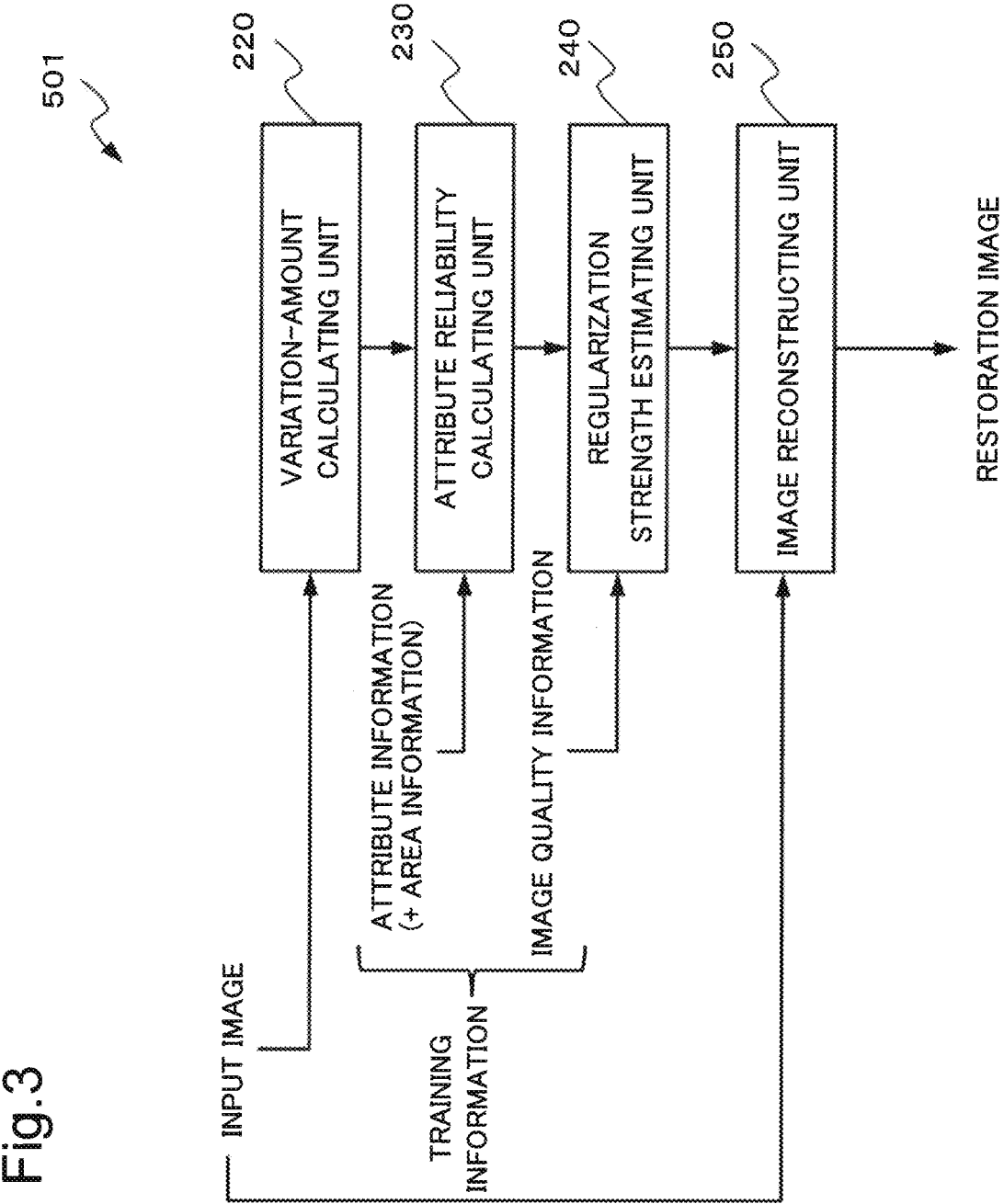
FIG. 3 is a block diagram illustrating an example of another configuration of the information processing device according to the first example embodiment.

FIG. 3 is a block diagram illustrating an example of the configuration of an information processing device 501 according to a first variant of the present example embodiment. The directions of the arrows in FIG. 3 illustrate examples without restricting the directions of signals between the blocks.

The information processing device 501 includes the variation-amount calculating unit 220, then attribute reliability calculating unit 230, the regularization strength estimating unit 240, and the image reconstructing unit 250. Then, the information processing device 501 receives the input image and the training information (attribute information and image quality information) via a network, not illustrated, operates in the same way as the image processing unit 20 of the information processing device 500, and transmits the reconstructed image to other devices via a network, not illustrated. Alternatively, the information processing device 501 may read the input image and the training information stored in a storage unit, not illustrated, and operate in the same way as the information processing device 500. It should be noted that, as described with the information processing device 500, the information processing device 501 does not have to receive area information. Therefore, the area information is parenthesized in FIG. 3.

The information processing device 501 constructed in this way can achieve the same effect as the information processing device 500.

This is because, as described above, the components of the information processing device 501 generate the reconstructed image in the same way as the configuration of the information processing device 500 based on the input image and the training information received via a network.

It should be noted that the information processing device 501 is the minimum configuration of the present example embodiment of the present invention.

[Variant 2]

Moreover, a plurality of components may be constructed by a single hardware entity in the information processing device 500.

Further, the information processing device 500 may be implemented as a computer device including a Central Processing Unit (CPU), Read Only Memory (ROM), and Random Access Memory (RAM). In addition to the above components, the information processing device 500 may be implemented as a computer device that further includes an Input and Output Circuit (IOC) and a Network Interface Circuit (NIC).

Figure 4:
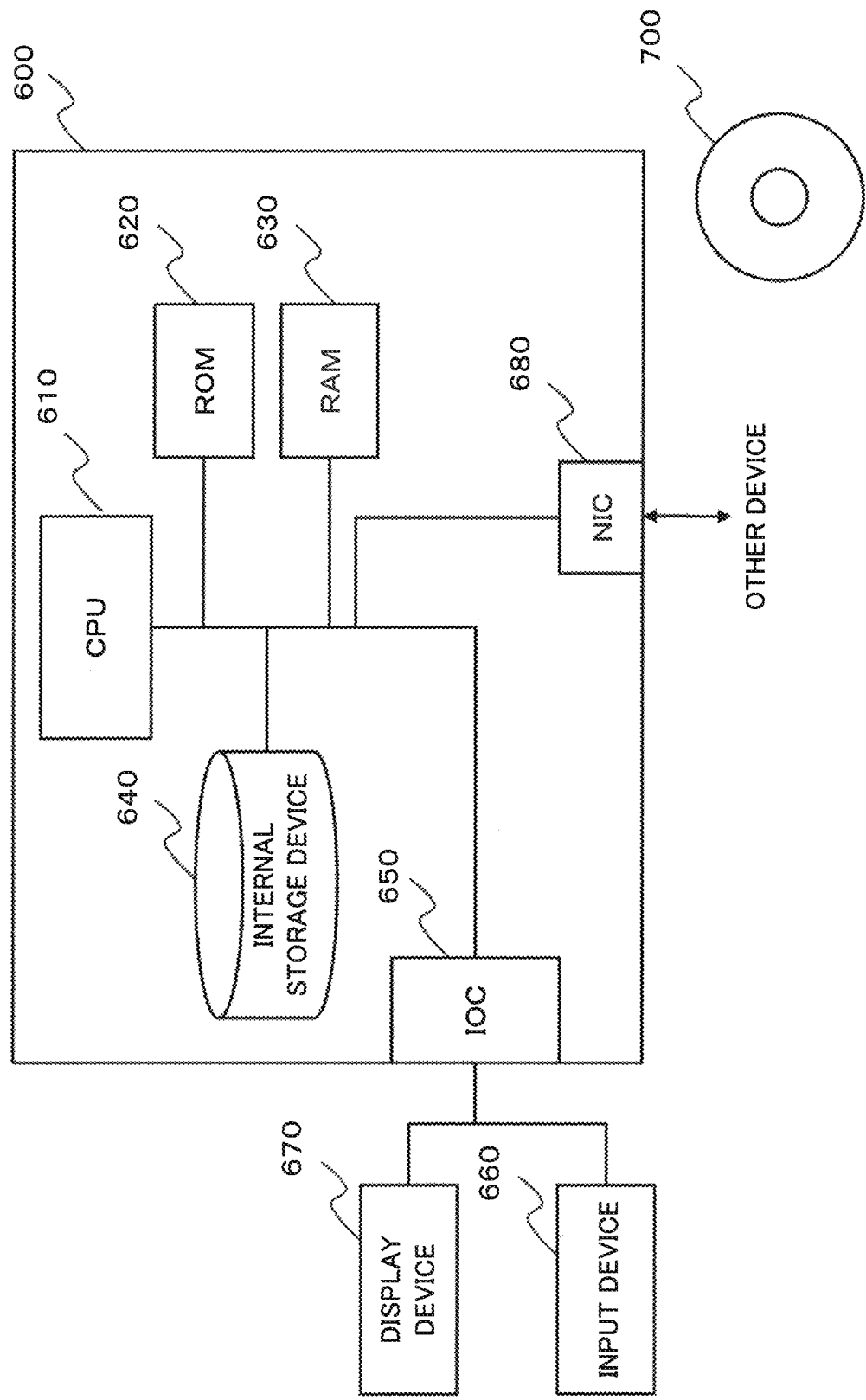
FIG. 4 is a block diagram illustrating an example of still another configuration of the information processing device according to the first example embodiment.

FIG. 4 is a block diagram illustrating an example of the configuration of an information processing device 600 according to the present variant.

The information processing device 600 includes a CPU 610, ROM 620, RAM 630, an internal storage device 640, an IOC 650, and a NIC 680, thereby configuring a computer device.

The CPU 610 reads a program from the ROM 620. Then, the CPU 610, based on the read program, controls the RAM 630, the internal storage device 640, the IOC 650, and the NIC 680. Then, the computer including the CPU 610 controls these components, thereby realizing a function as the image processing unit 20 as illustrated in FIG. 1. That is, the computer including the CPU 610 implements the functions of the training information receiving unit 210, the variation-amount calculating unit 220, the attribute reliability calculating unit 230, the regularization strength estimating unit 240, and the image reconstructing unit 250. The computer including the CPU 610 may further implement the functions of the image receiving unit 10 and the image outputting unit 30 illustrated in FIG. 1.

For implementing the functions, the CPU 610 may use the RAM 630 or the internal storage device 640 as a temporary storage of the program.

Further, the CPU 610 may read the program included in a recording medium 700 that stores the program in a computer readable manner, through a recording medium reader which is not illustrated. Alternatively, the CPU 610 may receive the program from an external device, not illustrated, via the NIC 680, store the program in the RAM 630, and operate based on the stored program.

The ROM 620 stores the program to be executed by the CPU 610 and static data. The ROM 620 is, for example, P-ROM (Programmable-ROM) or flash ROM.

The RAM 630 temporarily stores the program to be executed by the CPU 610 and data. The RAM 630 is, for example, D-RAM (Dynamic RAM).

The internal storage device 640 stores data and the program that are stored for a long term in the information processing device 600. Alternatively, the internal storage device 640 may operate as a temporary storage device of the CPU 610. The internal storage device 640 is, for example, a hard disk device, a magneto-optical disk device, an SSD (Solid State Drive), or a disk array device.

Here, the ROM 620 and the internal storage device 640 are non-transitory recording media. Whereas, the RAM 630 is a transitory recording medium. Then, the CPU 610 can operate based on the program stored in the ROM 620, internal storage device 640, or RAM 630. In other words, the CPU 610 can operate by using a non-transitory recording medium or a transitory recording medium.

The IOC 650 mediates data between the CPU 610, and the input device 660 and display device 670. The IOC 650 is, for example, an IO interface card or a USB (Universal Serial Bus) card.

The input device 660 is a device that receives input instructions from an operator of the information processing device 600. The input device 660 is, for example, a keyboard, a mouse, or a touch panel. The input device 660 may function as the image receiving unit 10 or the training information receiving unit 210.

The display device 670 is a device that displays information to the operator of the information processing device 600. The display device 670 is, for example, a liquid crystal display. The display device 670 may operate as the image outputting unit 30 or the training information receiving unit 210 (the area specifying unit 211).

The NIC 680 may relay exchange of data with an external device, not illustrated, via a network. The NIC 680 is, for example, a LAN (Local Area Network) card.

The information-processing device 600 constructed in this way can achieve the same effect as the information processing device 500.

This is because the CPU 610 of the information processing device 600 can realize the same functions as the information processing device 500 based on the program.

<Second Example Embodiment>

The following will describe a second example embodiment of the present invention with reference to the drawings.

[Description of Configuration]

Figure 9:
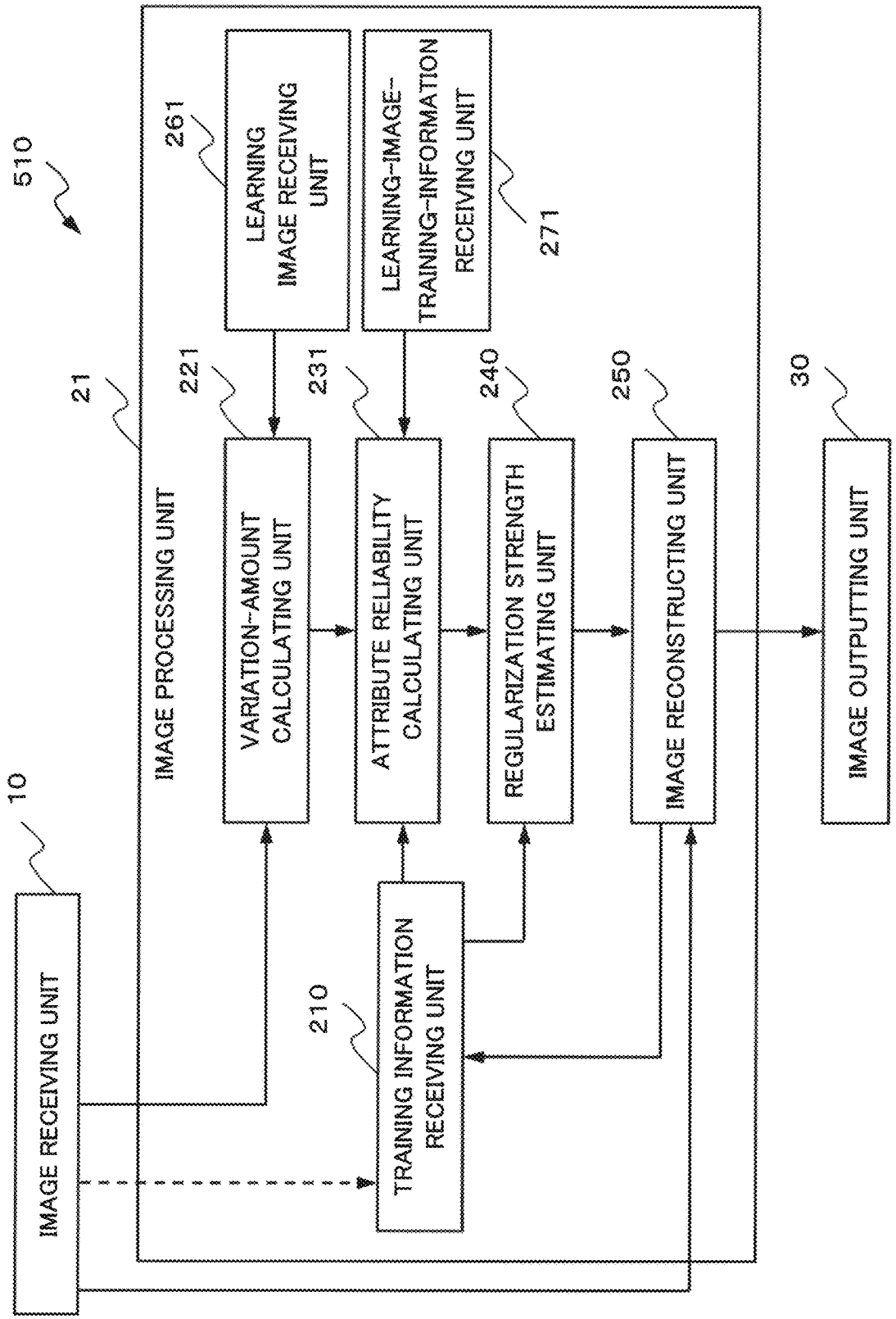
FIG. 9 is a block diagram illustrating an example of the configuration of an information processing device according to a second example embodiment.

FIG. 9 is a block diagram illustrating an example of the configuration of the information processing device 510 according to the second example embodiment. The directions of the arrows in FIG. 9 illustrate examples without restricting the directions of signals between the blocks.

As illustrated in FIG. 9, the information processing device 510 according to the second example embodiment differs from the information processing device 500 of the first example embodiment in that the information processing device 510 includes the image processing unit 21 instead of the information processing unit 20.

The image processing unit 21 differs from the image processing unit 20 in that the image processing unit 21 includes a variation-amount calculating unit 221 and an attribute reliability calculating unit 231, instead of the variation-amount calculating unit 220 and the attribute reliability calculating unit 230, and further includes a learning image receiving unit 261 and a learning-image-training-information receiving unit 271. Thus, the configuration and operation unique to the present example embodiment will be described while omitting the description of the same configuration and operation as the first example embodiment.

It should be noted that the information processing device 510 may be implemented using the computer illustrated in FIG. 4.

The learning image receiving unit 261 receives at least one image (learning image) that is different from the input image.

The learning-image-training-information receiving unit 271 receives training information relating to the learning image in the same way that the training information receiving unit 210 receives the training information (first training information) relating to the input image. In other words, the learning-image-training-information receiving unit 271 receives training information (second training information) that includes attribute information of pixels of a partial area of the learning image and image quality information desired for the attribute. It should be noted that the attribute information included in the second training information may be the same attribute information as the attribute information included in the first training information or different attribute information. Further, the attribute of the attribute information included in the second training information may be a variety of attributes in the description of the first example embodiment that have been previously described (for example, a property of a pixel, a type of an object, materials, a physical quantity, an optical property, or numerical information). The second training information may further include area information or preprocessing information. Then, the image reconstructing unit 250 may perform preprocessing by using the preprocessing information included in the second training information. It should be noted that the learning image receiving unit 261 and the learning-image-training-information receiving unit 271 may use all or a portion of the received learning image and training information. For example, the learning image receiving unit 261 and the learning-image-training-information receiving unit 271 may calculate similarity between the input image and the learning image and use the learning image, of which similarity is within a predetermined range, and training information relating to the learning information (second training information). Here, the method of calculating similarity between the input image and the learning image, which is used by the learning image receiving unit 261 and the learning-image-training-information receiving unit 271, is not particularly restricted. For example, the learning image receiving unit 261 and the learning-image-training-information receiving unit 271 may calculate similarity by using image feature quantities (a SIFT feature or a fisher vector) which are used in typical image processing.

The variation-amount calculating unit 221 calculates variation amounts based on the input image and the learning image. The variation-amount calculating unit 221 may apply the same method as the variation-amount calculating unit 220 of the first example embodiment to the input image and the learning image, as the method of calculating the variation amounts.

The attribute reliability calculating unit 231 calculates reliability relating to each attribute for all the pixels in the input image by using the attributes of the input image and the learning image and the variation amounts calculated by the variation-amount calculating unit 221.

[Description of Operation]

The following will describe the operation of the information processing device 510 according to the present example embodiment with reference to the drawings.

Figure 10:
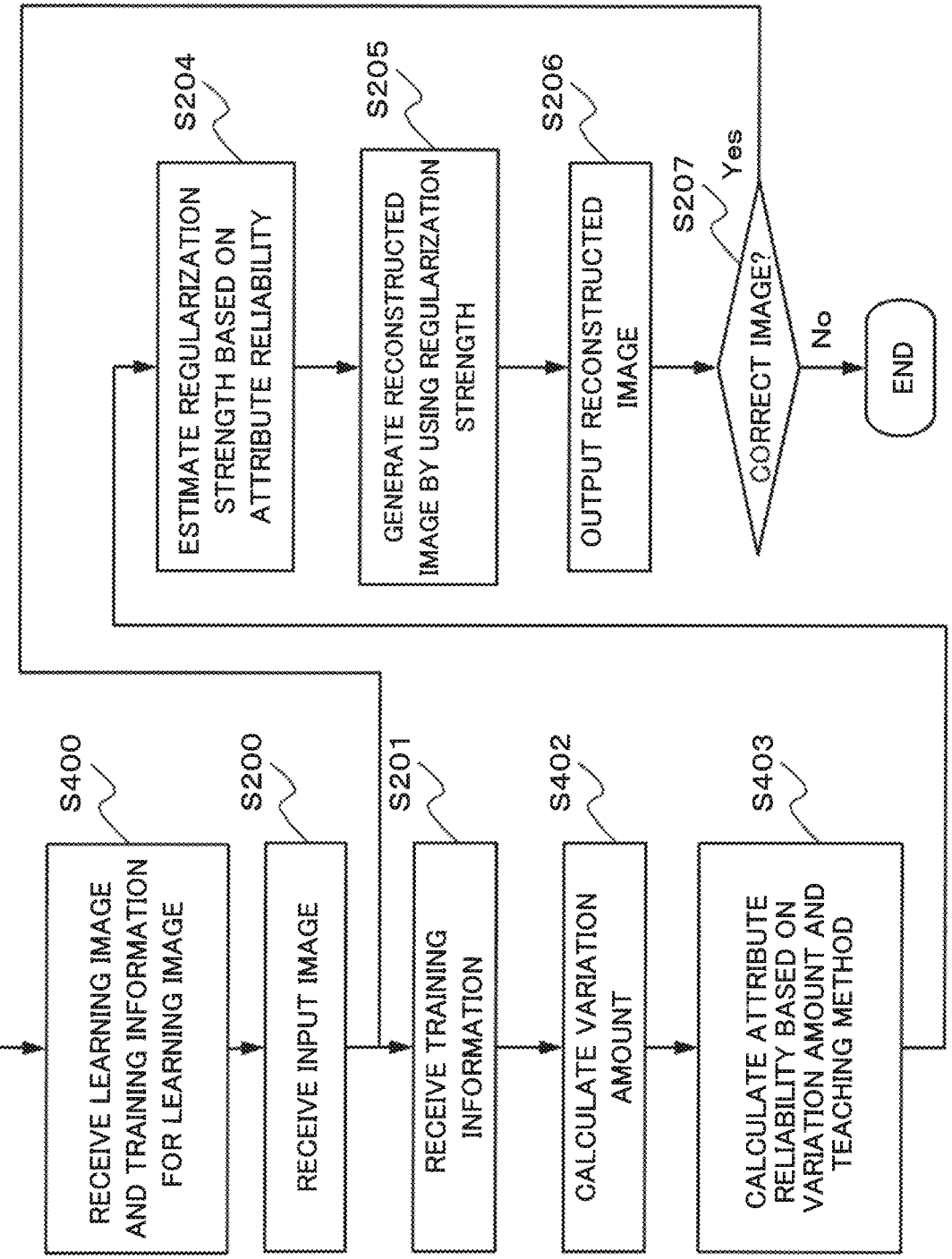
FIG. 10 is a flowchart illustrating an example of the operation of the information processing device according to the second example embodiment.

FIG. 10 is a flowchart illustrating an example of the operation of the information processing device 510. It should be noted that the same operations as FIG. 2 will be assigned the same signs while omitting the details thereof.

First, the learning image receiving unit 261 receives a learning image and the learning-image-training-information receiving unit 271 receives training information relating to the learning image (step S400).

Next, in the same way as the first example embodiment, the image receiving unit 10 receives an input image (step S200), and the training information receiving unit 210 receives training information for the input image (step S201).

Then, the variation-amount calculating unit 221 calculates the variation amounts based on the input image and the learning image (step S402).

Next, the attribute reliability calculating unit 231 calculates the attribute reliability based on the variation amounts and the training information for the input image and learning image (S402).

The operation thereafter is the same as the first example embodiment, thus, the details thereof will not be described.

[Description of Effects]

The following will describe the effect of the second example embodiment.

The information processing device 510 according to the second example embodiment can provide an effect of realizing more precise processing in addition to the effect of the first example embodiment.

This is because of the following reason:

The learning image receiving unit 261 receives the learning image. Further, the learning-image-training-information receiving unit 271 receives the training information relating to the learning image.

Then, the variation-amount calculating unit 221 calculates variation amounts based on the learning image and the input image. Thus, the variation-amount calculating unit 221 calculates the variation amounts based on a larger number of images compared with the variation-amount calculating unit 220. Therefore, the variation-amount calculating unit 221 can calculate an even more precise variation amount compared with the variation-amount calculating unit 220.

Further, the attribute reliability calculating unit 231 calculates the attribute reliability based on the training information relating to the learning image and the above highly precise variation amount in addition to the same input image as the first example embodiment and training information relating thereto. Thus, the attribute reliability calculating unit 231 can calculate attribute reliability with higher precision than the attribute reliability calculating unit 230 does.

Further, since the regularization strength estimating unit 240 estimates the regularization strengths based on the highly precise attribute reliability, the regularization strength estimating unit 240 can estimate even more precise regularization strengths.

Then, using highly precise regularization strengths, the image reconstructing unit 250 can generate an even more precise reconstructed image.

[Specific Operation Example]

The following will describe a more specific operation example of the information processing device 510 according to the second example embodiment.

The learning image receiving unit 261 receives images, such as surveillance camera images, medical images, or satellite images, as the learning images.

Further, the learning-image-training-information receiving unit 271 receives, for example, an attribute that a user of the information processing device 510 transmitted by using the user device and image quality information desired for the attribute, as the training information.

Alternatively, the learning-image-training-information receiving unit 271 may receive an attribute and image quality information desired for the attribute from a device that a person other than the user operates, as the training information.

For example, when a user is a medical professional, a medical professional who has more expertise in analysis of medical images than the user may transmit learning information optimal for analyzing medical images (attribute information and image quality information) to the information processing device 510. In such a case, the attribute information is, for example, information indicating whether a pixel is a diseased part or not. The image quality information is, for example, information where a regularization strength of an area other than the diseased part is "1." Then, the medical professional who is the user reconstructs the input image by using the learning information input by the medical professional with abundant experience. Through such an operation, medical professionals can share experience and know-how for image analysis with each other. Further, when the learning-image-training-information receiving unit 271 receives training information including preprocessing information, medical professionals can share the experience and know-how relating to preprocessing.

It should be noted that, in the example embodiments, the learning image and training information (attribute information and image quality information) that the learning image receiving unit 261 and the learning-image-training-information receiving unit 271 receive may be stored in other device not illustrated (for example, a storage device, such as a server). In such a case, the information processing device 510 may use information that is stored in the device as necessary, for example, in accordance with an instruction by a user of the information processing device 510.

Alternatively, the information processing device 510 may store variation amounts calculated by the variation-amount calculating unit 221, instead of learning images that the learning image receiving unit 261 receives. Recording variation amounts in this way, instead of learning images, enables users to share experience and know-how for image analysis with one another, while maintaining the confidentiality of the images.

While the invention has been particularly shown and described with reference to example embodiments thereof, the invention is not limited to these embodiments. It will be understood by those of ordinary skill in the art that various variations in form and details may be made therein without departing from the spirit and scope of the present invention as defined by the claims.

This application is based upon and claims the benefit of priority from Japanese patent application No. 2014-255158, filed on Dec. 17, 2014, the disclosure of which is incorporated herein in its entirety by reference.

INDUSTRIAL APPLICABILITY

The present invention is applicable to use for purpose of analyzing criminal investigation images or satellite images. Further, the present invention is applicable to use for purpose of analyzing medical images. In addition, the present invention is applicable to use for purpose of sharing experience and know-how of image analyses by image analysts based on the calculated regularization strengths or the use of training information in respective image analyses.

REFERENCE SIGNS LIST

10 Image receiving unit
20 Image processing unit
21 Image processing unit
30 Image outputting unit
210 Training information receiving unit
211 Area specifying unit
212 Training information acquiring unit
220 Variation-amount calculating unit
221 Variation-amount calculating unit
230 Attribute reliability calculating unit
231 Attribute reliability calculating unit
240 Regularization strength estimating unit
250 Image reconstructing unit
261 Learning image receiving unit
271 Learning-image-training-information receiving unit
500 Information processing device
501 Information processing device
510 Information processing device
600 Information processing device
610 CPU
620 ROM
630 RAM
640 Internal storage device
650 IOC
660 Input device
670 Display device
680 NIC
700 Recording medium

The invention claimed is:

1. An information processing device comprising:
a Central Processing unit (CPU); and
a memory connected to the CPU and storing a program, wherein the CPU reads the program from the memory and configures:
a variation-amount calculating unit that, for an input image as a target to be processed, calculates a variation amount between a value of a predetermined pixel of the input image and values of peripheral pixels of the predetermined pixel;
an attribute reliability calculating unit that, based on an attribute that is a property of pixels within a specified area in the input image and the variation amount, calculates attribute reliability that is reliability of the attribute of the pixel of the input image;
a regularization strength estimating unit that, based on image quality information that is information about image quality for the attribute and the attribute reliability, estimates a regularization strength of the pixel in the input image; and
an image reconstructing unit generates a reconstructed image that is an image acquired by reconstructing the input image by using the regularization strength;
wherein
for each pixel, the regularization strength estimating unit estimates the regularization strength such that the higher the attribute reliability is, the more the pixel conforms to the image quality information for the attribute, and estimates the regularization strength such that the lower the attribute reliability is, the more the pixel is apart from the image quality information for the attribute.

2. The information processing device according to claim 1,
wherein
the image reconstructing unit generates the reconstructed image based on a regularization term representing a strength of regularization for each pixel based on the regularization strength and an error term representing a difference between pixels of a degraded image that is an image acquired by deteriorating the reconstructed image and the input image.

3. The information processing device according to claim 1,
wherein
the attribute reliability calculating unit calculates reliability of the attribute, based on area information that is information of an area, for which the attribute is specified.

4. The information processing device according to claim 1, the CPU further configures:
an image receiving unit that receives the input image;
an image outputting unit that transmits the reconstructed image; and
a training information receiving unit that receives training information including information of the attribute and the image quality information,
wherein
the training information receiving unit receives the regularization strength of a pixel in a predetermined area of the reconstructed image that is output by the image outputting unit, as the image quality information.

5. The information processing device according to claim 4,
wherein
the image reconstructing unit generates a plurality of reconstructed images,
the image outputting unit transmits the plurality of reconstructed images, and
the training information receiving unit receives the regularization strength of pixels in a plurality of areas in the plurality of reconstructed images that are transmitted by the image outputting unit as the image quality information.

6. The information processing device according to claim 4, wherein
the training information receiving unit further including:
an area specifying unit that specifies an area in the reconstructed image, for which the regularization strength of the pixels is specified; and
a training information acquiring unit that acquires the attribute and the regularization strength of the pixels of the area as training information of the specified area.

7. The information processing device according to claim 1, the CPU further configures:
a learning image receiving unit that receives a learning image that is an image different from the input image; and
a learning image training information receiving unit that receives second training information relating to the learning image,
wherein
the variation amount calculating unit calculates the variation amount based on the learning image; and
the attribute reliability calculating unit calculates the attribute reliability by using the second training information for the learning image.

8. An information processing method comprising:
for an input image as a target to be processed, calculating a variation amount between a value of a predetermined pixel of the input image and values of peripheral pixels of the predetermined pixel;
based on an attribute that is a property of pixels within a specified area in the input image and the variation amount, calculating attribute reliability that is reliability of the attribute of the pixel of the input image;
based on image quality information that is information about image quality for the attribute and the attribute reliability, estimating a regularization strength of the pixel in the input image:
generating a reconstructed image that is an image acquired by reconstructing the input image by using the regularization strength; and
for each pixel, estimating the regularization strength such that the higher the attribute reliability is, the more the pixel conforms to the image quality information for the attribute, and estimates the regularization strength such that the lower the attribute reliability is, the more the pixel is apart from the image quality information for the attribute.

9. The information processing method according to claim 8, further comprising:
generating the reconstructed image based on a regularization term representing a strength of regularization for each pixel based on the regularization strength and an error term representing a difference between pixels of a degraded image that is an image acquired by deteriorating the reconstructed image and the input image.

10. The information processing method according to claim 8, further comprising:
calculating reliability of the attribute, based on area information that is information of an area, for which the attribute is specified.

11. The information processing method according to claim 8, further comprising:
- receiving the input image;
- transmitting the reconstructed image; and
- receiving training information including information of the attribute and the image quality information, and
- receiving the regularization strength of a pixel in a predetermined area of the reconstructed image that is output, as the image quality information.

12. A non-transitory computer-readable recording medium embodying a program, the program causing a computer to perform a method, the method comprising:
- for an input image as a target to be processed, calculating a variation amount between a value of a predetermined pixel of the input image and values of peripheral pixels of the predetermined pixel;
- based on an attribute that is a property of pixels within a specified area in the input image and the variation amount, calculating attribute reliability that is reliability of the attribute of the pixel of the input image;
- based on image quality information that is information about image quality for the attribute and the attribute reliability, estimating a regularization strength of the pixel in the input image;
- generating a reconstructed image that is an image acquired by reconstructing the input image by using the regularization strength; and
- for each pixel, estimating the regularization strength such that the higher the attribute reliability is, the more the pixel conforms to the image quality information for the attribute, and estimates the regularization strength such that the lower the attribute reliability is, the more the pixel is apart from the image quality information for the attribute.

13. The medium according to claim 12, further embodying the program to perform the method, the method further comprising:
- generating the reconstructed image based on a regularization term representing a strength of regularization for each pixel based on the regularization strength and an error term representing a difference between pixels of a degraded image that is an image acquired by deteriorating the reconstructed image and the input image.

14. The medium according to claim 12, further embodying the program to perform the method, the method further comprising:
- calculating reliability of the attribute, based on area information that is information of an area, for which the attribute is specified.

15. The medium according to claim 12, further embodying the program to perform the method, the method further comprising:
- receiving the input image;
- transmitting the reconstructed image; and
- receiving training information including information of the attribute and the image quality information, and
- receiving the regularization strength of a pixel in a predetermined area of the reconstructed image that is output, as the image quality information.

* * * * *